United States Patent
Kang

(10) Patent No.: US 7,820,338 B2
(45) Date of Patent: Oct. 26, 2010

(54) LIQUID FUEL CARTRIDGE AND DIRECT LIQUID FEED FUEL CELL HAVING THE SAME

(75) Inventor: Sang-kyun Kang, Seongnam-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1372 days.

(21) Appl. No.: 11/284,972

(22) Filed: Nov. 23, 2005

(65) Prior Publication Data

US 2006/0115702 A1    Jun. 1, 2006

(30) Foreign Application Priority Data

Nov. 26, 2004    (KR) ............... 10-2004-0097918

(51) Int. Cl.
*H01M 8/04* (2006.01)
*H01M 8/02* (2006.01)
*B65D 6/00* (2006.01)

(52) U.S. Cl. .............. 429/512; 429/515; 429/516; 220/4.12

(58) Field of Classification Search ............ None
See application file for complete search history.

(56) References Cited

U.S. PATENT DOCUMENTS 6,303,244 B1    10/2001    Surampudi
6,610,433 B1    8/2003    Herdeg et al.
2003/0082427 A1    5/2003    Prasad et al.
2004/0148857 A1*    8/2004    Strizki et al. ............... 48/127.9

FOREIGN PATENT DOCUMENTS

| EP | 1329972 | | 7/2003 |
|---|---|---|---|
| JP | 2003-092128 | * | 3/2003 |
| JP | 2003-142135 | | 5/2003 |
| JP | 2004087222 | | 3/2004 |
| JP | 2004-152741 | | 5/2004 |
| JP | 2004-281332 A1 | | 10/2004 |
| JP | 2005-032720 | | 2/2005 |
| JP | 2005-108657 | | 4/2005 |
| KR | 10-2003-0091485 A1 | | 12/2003 |

* cited by examiner

*Primary Examiner*—Dah-Wei Yuan
*Assistant Examiner*—Angela J. Martin
(74) *Attorney, Agent, or Firm*—H.C. Park & Associates, PLC

(57) ABSTRACT

A liquid fuel cartridge of a direct liquid feed fuel cell for storing liquid fuel, supplying the liquid fuel to a fuel cell, and recovering water from the cathode of the fuel cell stack. The liquid fuel cartridge has a liquid fuel supplying hole formed at one end, a recovery hole formed at a second end, and a moveable wall that separates the water from the liquid fuel. When water is pumped in through the recovery hole, the moveable wall slides in the fuel cartridge and expels the liquid fuel into the fuel cell stack. The fuel cartridge also includes a transparent window or a metal detector for determining the position of the moveable wall and, thus, the quantity of liquid fuel remaining in the fuel cartridge.

11 Claims, 3 Drawing Sheets

LIQUID FUEL CARTRIDGE AND DIRECT LIQUID FEED FUEL CELL HAVING THE SAME

CROSS REFERENCE TO RELATED APPLICATION

This application claims priority to and the benefit of Korean Patent Application No. 10-2004-0097918, filed on Nov. 26, 2004, which is hereby incorporated by reference for all purposes as if fully set forth herein.

BACKGROUND OF THE INVENTION

1. Field of the Invention

The present invention relates to a liquid fuel cartridge which stores water generated by a fuel reaction, and a direct liquid feed fuel cell having the same.

2. Discussion of the Background

A direct liquid feed fuel cell is an electric generator which generates electricity by an electrochemical reaction between an organic compound fuel such as methanol or ethanol, and an oxidant such as oxygen. Since a direct liquid feed fuel cell has very high energy density and power density and directly uses a liquid fuel such as methanol or ethanol, a peripheral device such as a fuel reformer is not needed and fuel can be easily stored and supplied.

Referring to FIG. 1, a conventional direct liquid feed fuel cell has a structure in which an electrolytic membrane 1 is interposed between an anode 2 and a cathode 3. The anode 2 and the cathode 3 respectively include diffusion layers 22 and 32 for supply and diffusion of fuel, catalyst layers 21 and 31 in which an oxidation/reduction reaction of fuel occurs, and electrode supporters 23 and 33. A precious metal catalyst such as platinum with excellent work function even at a low temperature can be used for a catalyst for the electrode reaction. An alloy containing a transition metal such as ruthenium, rhodium, osmium, or nickel can be used to prevent catalyst poisoning caused by carbon monoxide, a reaction by-product. Carbon-based material such as carbon paper or carbon fabric, is frequently used for the electrode supporters 23 and 33, and may be water-proof to maintain flow channels so that fuel can be supplied and a reaction product can be discharged. The electrolytic membrane 1 may be a high molecular membrane having a thickness of 50-200 μm, and may be a hydrogen ion exchange membrane which contains moisture and has ion conductivity.

An electrode reaction of a direct methanol fuel cell (DMFC), which uses methanol and water as mixed fuel, includes an anode reaction in which fuel is oxidized, and a cathode reaction caused by reduction of hydrogen ions and oxygen. The reactions are presented in equations 1, 2, and 3.

$$CH_3OH + H_2O \rightarrow CO_2 + 6H^+ + 6e^- \text{ (Anode reaction)} \quad (1)$$

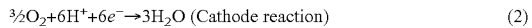

$$\tfrac{3}{2}O_2 + 6H^+ + 6e^- \rightarrow 3H_2O \text{ (Cathode reaction)} \quad (2)$$

$$CH_3OH + \tfrac{3}{2}O_2 \rightarrow 2H_2O + CO_2 \text{ (Overall reaction)} \quad (3)$$

In the anode 2, where oxidation occurs according to equation 1, carbon dioxide, hydrogen ions, and electrons are generated by a reaction between methanol and water. The generated hydrogen ions are transferred to the cathode 3 via the electrolytic membrane 1. In the cathode, where reduction occurs according to equation 2, water is generated by a reaction between hydrogen ions, electrons supplied via an external circuit (not shown) and oxygen. Thus, in a DMFC overall reaction according to equation 3, methanol and oxygen react to form water and carbon dioxide. According to the molar ratio of equation 3, 1 mole methanol reacts with oxygen to form 2 moles of water.

Since methanol as liquid fuel reacts with water at a molar ratio of 1:1, as shown in equation 1, a mixed liquid with 1 mole methanol and 1 mole water can be used as a liquid fuel. This mixed liquid is about 64% methanol, by weight. However, when using high-concentration fuel with a 1-to-1 ratio of methanol to water, electric generating performance may be degraded due to crossover of fuel across the ion exchange membrane before the fuel can react with the catalyst in the anode. Thus, to avoid crossover, dilute low-concentration methanol with between 2 and 8% by volume can be used. However, when using low-concentration methanol, the total quantity of methanol is low, and thus the total amount of energy from the low quantity of fuel is accordingly reduced. Thus, in order to increase the amount of energy from the fuel, a fuel cell system with a fuel tank able to store a high-concentration of pure methanol is required.

Further, processing water generated by a reaction in a fuel cell is problematic. The water may be stored in a separate water tank in a fuel cell system.

U.S. Pat. No. 6,303,244 discloses a technique for storing methanol and water separately, mixing them using a mixer, and supplying them to a fuel cell stack, as shown in FIG. 2.

Referring to FIG. 2, air for a reduction reaction is supplied to an internal cathode of a stack 4 and vented to the outside from the cathode. Thus, water as a chemical by-product is withdrawn and drained into a water tank 6. High-concentration or pure methanol is stored in a fuel tank 7.

Water and methanol are stored in separate tanks 6 and 7, and water and methanol are each pumped to a fuel mixer 8, mixed at the fuel mixer 8 and supplied to an anode of the stack 4.

However, using this method, a separate water tank 8 is needed in addition to fuel tank 7. Furthermore, a pump is needed for each tank. Due to the space occupied by the separate water tank and the pumps, the energy density of the fuel cell system is reduced, thereby reducing the inherent advantages of a DMFC.

SUMMARY OF THE INVENTION

The present invention provides a liquid fuel cartridge which stores recovered water at a space formed when fuel is exhausted, without installing a separate water tank, and a direct liquid feed fuel cell having the same.

Additional features of the invention will be set forth in the description which follows, and in part will be apparent from the description, or may be learned by practice of the invention.

The present invention discloses a liquid fuel cartridge for a direct liquid feed fuel cell, including a flow space for storing liquid fuel and water, a liquid fuel supplying hole formed at a first end of the flow space and coupled with an anode of the direct liquid feed fuel cell, a recovery hole formed at a second end of the flow space and coupled with a cathode of the direct liquid feed fuel cell, and a moveable wall disposed in the flow space, the moveable wall separating water and liquid fuel in the flow space.

The present invention also discloses a direct liquid feed fuel cell, including a fuel cell stack, a liquid fuel cartridge, coupled with an anode of the fuel cell stack, for storing liquid fuel supplied to the anode, and a pump, coupled with the fuel cell stack and the liquid fuel cartridge, for transferring liquid fuel from the liquid fuel cartridge to the fuel cell stack and for transferring water from a cathode of the fuel cell stack to the liquid fuel cartridge.

The present invention also discloses a method for pumping liquid fuel to a fuel cell stack, including pumping water formed at a cathode of a fuel cell stack from the cathode to a flow space, sliding a moveable wall within the flow space in response to receiving a first quantity of water, and expelling a second quantity of liquid fuel from the flow space to the fuel cell stack in response to sliding a moveable wall within the flow space.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
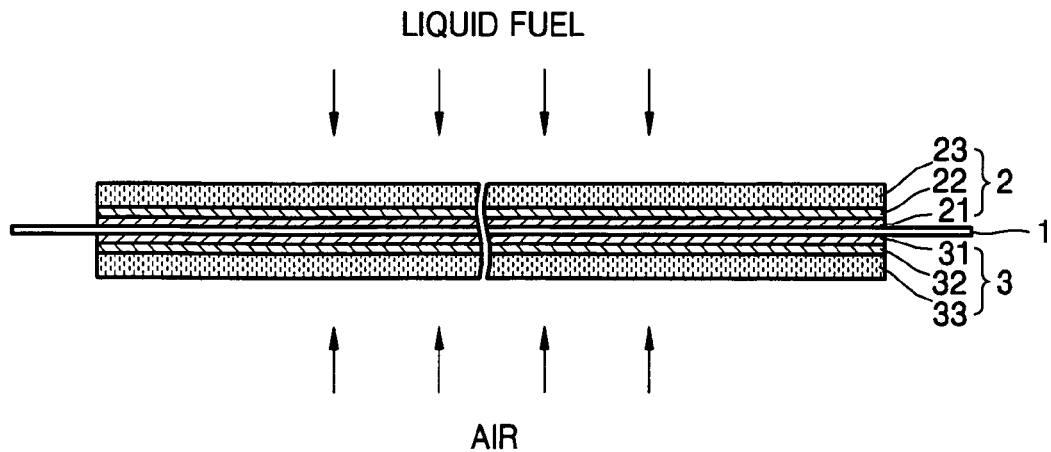
FIG. 1 shows a cross-sectional view of a basic structure of a direct liquid feed fuel cell.
Figure 2:
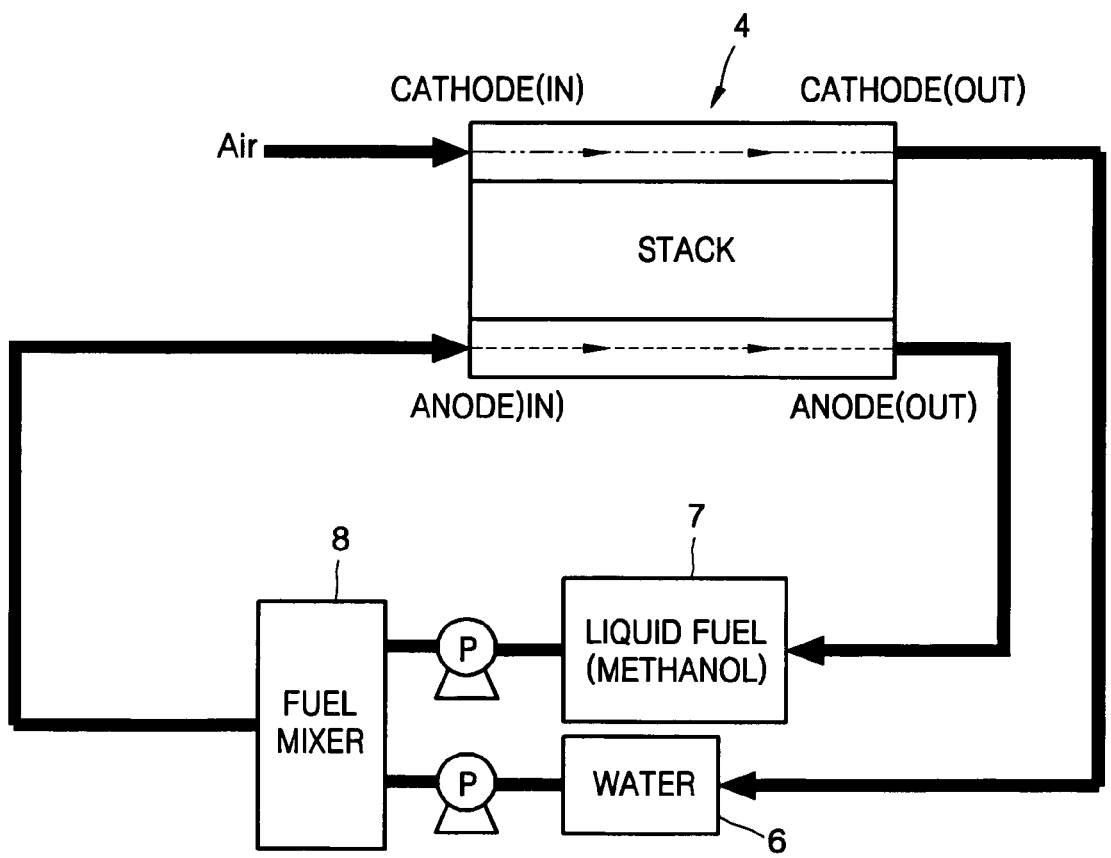
FIG. 2 shows a schematic configuration of a conventional direct liquid feed fuel cell.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 3:
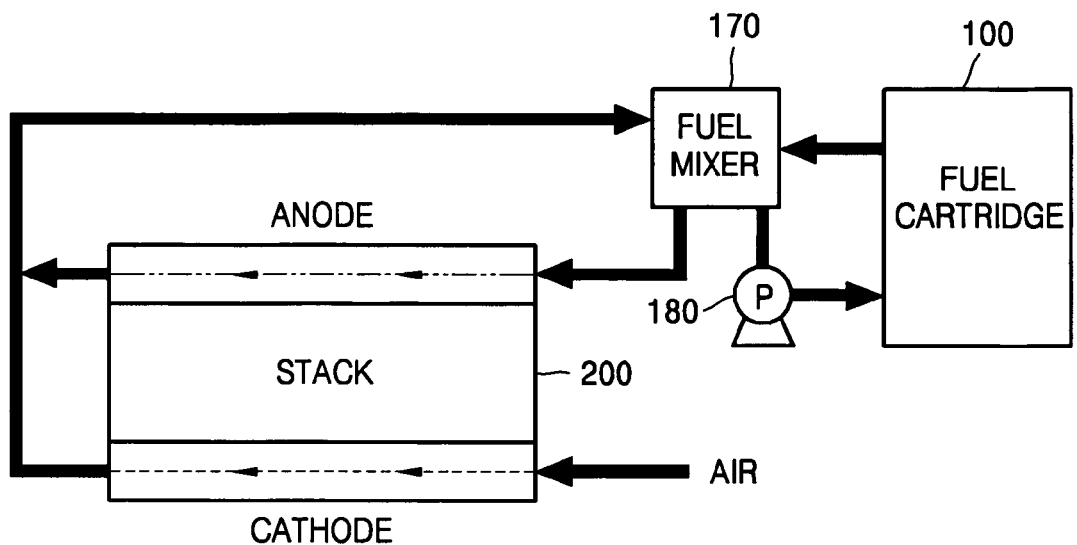
FIG. 3 shows a schematic configuration of a direct liquid feed fuel cell according to an embodiment of the present invention.
Figure 4:
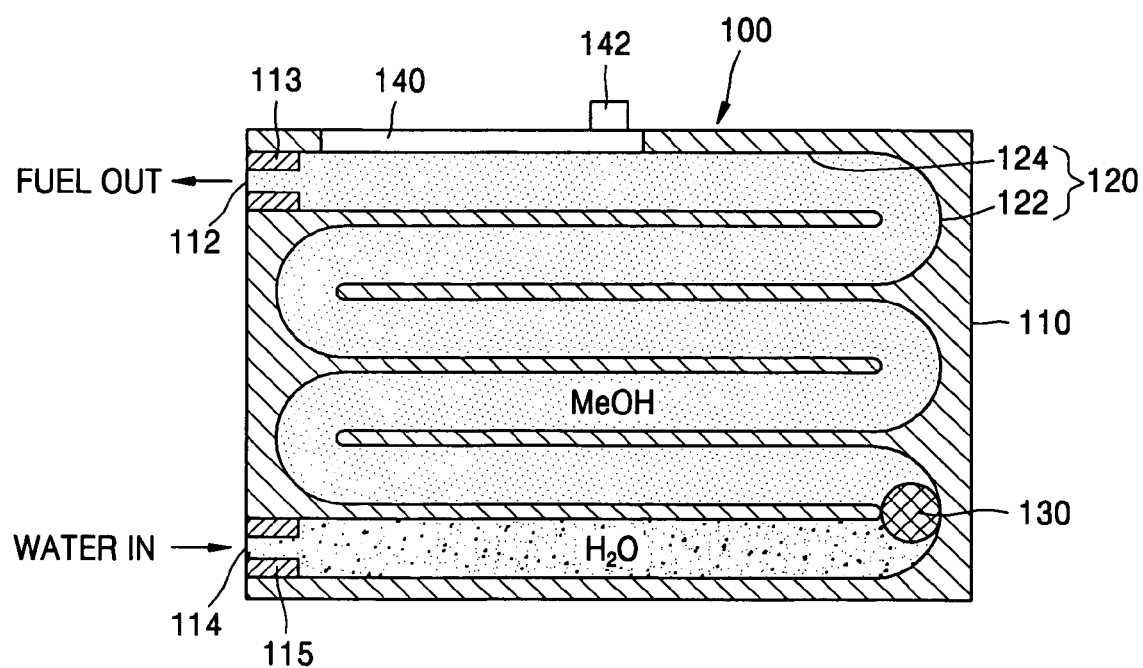
FIG. 4 shows a schematic cross-sectional view of the liquid fuel cartridge of FIG. 3.

FIG. 3 shows a schematic configuration of a direct liquid feed fuel cell according to an embodiment of the present invention. FIG. 4 shows a schematic cross-sectional view of a liquid fuel cartridge from FIG. 3.

Referring to FIG. 3, liquid fuel such as methanol is supplied to an anode of a direct liquid feed fuel cell stack 200 via a fuel mixer 170 from the liquid fuel cartridge 100. Air is supplied to a cathode of the direct liquid feed fuel cell stack 200.

Water generated at the cathode is withdrawn through the fuel mixer 170, where a portion of water is mixed with the liquid fuel from the liquid fuel cartridge 100, and the remaining water is withdrawn through a water pump 180 and pumped into the liquid fuel cartridge 100.

Referring to FIG. 4, a liquid fuel cartridge 100 according to the present invention includes a housing 110 in which liquid fuel is stored. A flow space 120 in which methanol and water are stored is formed in the rectangular parallelepiped housing 110. The flow space 120 includes a plurality of bent portions 122 and a plurality of straight line portions 124. The bent portions 122 alter the direction of the flow space by between 60 and 180 degrees. A moving wall 130 is disposed in the flow space 120. The moving wall 130 may be a cylindrical, spherical shape, or another shape capable of sliding through the flow space.

The flow space 120 may be formed as a serpentine shape so that the volume of space in the housing 110, excluding the flow space 120, is reduced. Thus, the volume of flow space 120 within the housing 110 is increased.

A liquid fuel supplying hole 112 is formed at one end of the flow space 120, through which fuel is supplied to a direct liquid feed fuel cell. A recovery hole 114 is formed at the other end of the flow space 120, through which water formed in the cathode of the direct liquid feed fuel cell enters. First stopper 113 is formed at the liquid fuel supplying hole 112 and second stopper 115 is formed at the recovery hole 114 to prevent the moving wall from ejecting out of either hole.

The moving wall 130 may be formed of polymer having a specific gravity higher than 0.8, which is the specific gravity of methanol, and lower than 1.0, which is the specific gravity of water, where the polymer does not react with the methanol. For example, the moving wall 130 may be formed of polyethylene or polypropylene.

The moving wall 130 is arranged at a boundary surface between water filled through the recovery hole 114 and methanol to be consumed from liquid fuel supplying hole 112. As the liquid fuel is drawn out of the liquid fuel cartridge 100, the moving wall 130 moves toward the liquid fuel supplying hole 112 in the flow space 120. The volume in the flow space 120 between the liquid fuel supplying hole 112 and the moving wall 130 represents the volume or quantity of methanol remaining in the liquid fuel cartridge 100. Thus, the amount of liquid fuel remaining in the liquid fuel cartridge 110 can be checked by determining the position of the moving wall 130 in relation to the liquid fuel supplying hole 112.

A transparent window 140, through which the flow space 120 near the liquid fuel supplying hole 112 in the housing 110 can be seen, can be formed for detecting the position of the moving wall 130.

Alternatively, the moving wall 130 may have a metallic material on its partial surface and a hollow structure or a structure having multiple hollow spaces. Therefore, the specific gravity of the moving wall 130 can be lower than 1.0, the specific gravity of water. A metal detector 142 can be installed near the liquid fuel supplying hole 112 at the housing 110. When the moving wall 130 moves near the metal detector 142, the metal detector 142 can generate an electrical signal to notify a user that the liquid fuel in the liquid fuel cartridge 100 is almost exhausted.

Although both the metal detector 142 and the transparent window 140 are shown in FIG. 4, an embodiment of this invention may include only one of these components for determining the quantity of liquid fuel remaining in the liquid fuel cartridge 110.

The liquid fuel cartridge 100 with the above structure can have straight line portions 124 with length designed to correspond to unused space in the direct liquid feed fuel cell so that internal space of the fuel cell can be used effectively.

Water from the fuel mixer 170 is withdrawn through a water pump 180 and pumped into the flow space 120 of the liquid fuel cartridge 100 through the recovery hole 114 of the liquid fuel cartridge 100. When the water is pumped in to the liquid fuel cartridge 100, the moving wall 130 is pushed and moves in the flow space 120. Distribution of water mixed with the liquid fuel by the fuel mixer 170 and water withdrawn through the liquid fuel cartridge 100 may be performed by a mechanical distributor (not shown). Unreacted fuel in the anode is also recovered through the fuel mixer 170.

As shown in FIG. 3, a single liquid pump 180 is installed between the recovery hole 114 of the liquid fuel cartridge 100 and the fuel mixer 170 for pumping water from the fuel mixer 170 to the liquid fuel cartridge 100. When the liquid pump 180 pumps water into the liquid fuel cartridge 100, the water moves the moveable wall 130 along the flow space 120 towards the liquid fuel supply hole 112. The movement of the moveable wall 130 also pushes liquid fuel out of the liquid fuel supply hole 112 and into the fuel mixer 170. Thus the liquid pump 180 recovers water and ejects fuel simultaneously. Alternatively, a liquid fuel pump (not shown) may be disposed between the liquid fuel supplying hole 112 of the liquid fuel cartridge 100 and the fuel mixer 170 to eject fuel and recover water.

Pure or high-concentration liquid fuel such as methanol is stored in the liquid fuel cartridge 100. In addition, water flowed out of the fuel cell is stored in the liquid fuel cartridge 100. The amount of methanol supplied and the amount of water recovered may be equal so the total flow in and out of the liquid fuel cartridge 100 is balanced.

According to the DMFC overall reaction of equation 3, 1 mole methanol (about 40 cm$^3$) reacts to form 2 mole water (about 36 cm$^3$). The volume of the formed water is approximately 90% of the consumed methanol. Thus, where a 91%-methanol/9%-water solution is stored in the liquid fuel cartridge 100 and 1 ml of the methanol solution is used, 0.91 ml methanol is used and 0.09 ml water remains. Further, a volume of water equal to about 90% of the volume of the methanol, or approximately 0.82 ml water, is generated from the reaction. Thus, the volume of water remaining after the fuel reaction is 0.09 ml water+0.82 ml water=0.91 ml water, which equals the volume of methane consumed in the reaction. Thus the volume of liquid consumed and recovered in the liquid fuel cartridge 100 during the fuel reaction is balanced.

Figure 5:
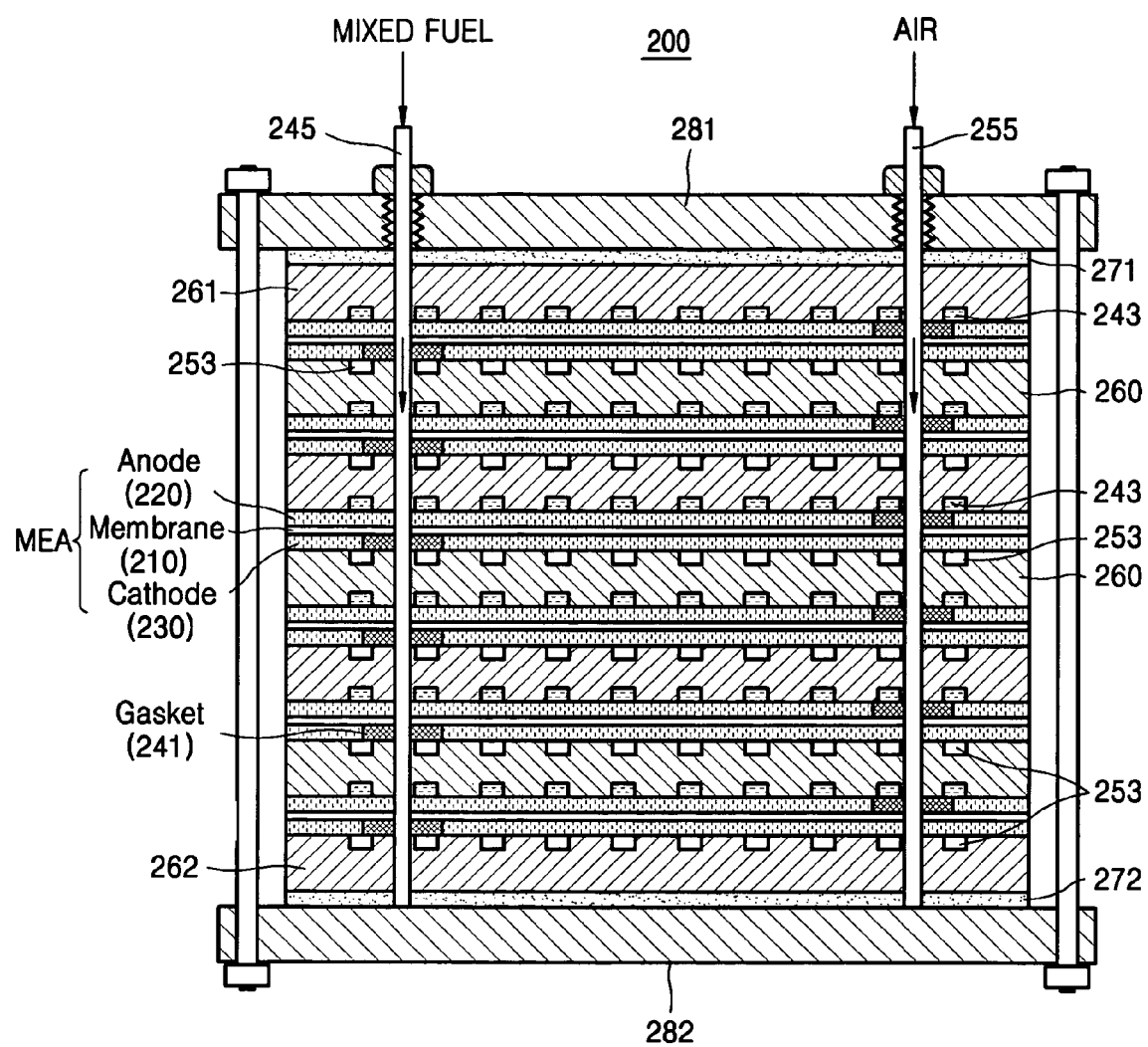
FIG. 5 shows a schematic diagram of a structure of a stack cell having the liquid cell cartridge according to the present invention.

FIG. 5 is a schematic diagram of a direct liquid feed fuel cell stack having the liquid cell cartridge according to the present invention. Referring to FIG. 5, a plurality of membrane electrode assemblies (MEAs), in which an anode 220 and a cathode 230 are arranged at both sides of a membrane 210, are electrically disposed in a forward direction, and an intermediate conductive plate 260 is interposed between MEAs. The intermediate conductive plate 260 corresponds to a bipolar plate. Flow channels 243 and 253 are formed at surfaces of a bipolar plate 260 that contacts an anode 220 and a cathode 230. Terminal conductive plate 261 is disposed above the stack and terminal conductive plate 262 is disposed below the stack. A liquid fuel flow channel 243 is formed at an inner surface of the terminal conductive plate 261, and an air flow charnel 253 is formed at an inner surface of the terminal conductive plate 262. Current collecting plate 271 is disposed on an outer surface of the terminal conductive plate 261 and current collecting plate 272 is disposed on an outer surface of the terminal conductive plate 262.

The MEAs, the intermediate conductive plates 260, the terminal conductive plates 261 and 262, and the current collecting plates 271 and 272 are coupled together by fixation end plates 281 and 282.

Fuel inlet holes 245 and 255 are formed in the stack in a vertical direction, and mixed fuel or air alone can enter into either of the fuel inlet holes 245 and 255. Mixed fuel or air then passes through the flow channels 243 and 253, and unreacted fuel of liquid fuel or air, water, and $CO_2$ are exhausted through each fuel outlet hole (not shown). FIG. 5 shows the fuel inlet hole 245 into which mixed fuel enters, and the fuel inlet hole 255 into which air enters. In order to block undesired flow, a gasket 241 may be used. This flow-forming structure has a common structure and thus a detailed description thereof is omitted.

The fuel mixer 170 shown in FIG. 3 and FIG. 4 may be coupled with the fuel inlet hole 245 and may be coupled with a fuel outlet hole (not shown) in the above stack structure.

As described above, in the liquid fuel cartridge and a direct liquid feed fuel cell according to the present invention, liquid fuel having a high energy density can be stored in the liquid fuel cartridge so that power generation time can be lengthened. In addition, since only one pump for a fuel pump or a water pump is needed, the number of pumps can be reduced. Furthermore, the position of a moving wall can be detected so that consumption of fuel can be monitored.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid fuel cartridge for a direct liquid feed fuel cell, comprising:
   a flow space for storing liquid fuel and water;
   a liquid fuel supplying hole formed at a first end of the flow space and coupled with an anode of the direct liquid feed fuel cell;
   a recovery hole formed at a second end of the flow space and coupled with a cathode of the direct liquid feed fuel cell; and
   a moveable wall disposed in the flow space, the moveable wall separating water and liquid fuel in the flow space.

2. The liquid fuel cartridge of claim 1, wherein the flow space comprises:
   a first straight line portion;
   a second straight line portion; and
   a bent portion coupled to the first straight line portion and the second straight line portion.

3. The liquid fuel cartridge of claim 2, wherein the bent portion alters the direction of the flow space by between 60 degrees and 180 degrees.

4. The liquid fuel cartridge of claim 2, wherein the moving wall has a cylindrical or spherical shape.

5. The liquid fuel cartridge of claim 1, further comprising:
   a first stopper formed at the liquid fuel supplying hole, a maximum dimension of a flow channel through the first stopper smaller than a minimum dimension of the moveable wall;
   a second stopper formed at the recovery hole, a maximum dimension of a flow channel through the second stopper smaller than a minimum dimension of the moveable wall.

6. The liquid fuel cartridge of claim 1, wherein a specific gravity of the moveable wall is between about 0.8 and about 1.0.

7. The liquid fuel cartridge of claim 5, wherein the moving wall comprises polyethylene or polypropylene.

8. The liquid fuel cartridge of claim 1, further comprising: a housing in which in the flow space is arranged.

9. The liquid fuel cartridge of claim 7, wherein the housing comprises a transparent window around the liquid fuel supplying hole.

10. The liquid fuel cartridge of claim 7, wherein the housing comprises a metal detector and the moveable wall comprises a metallic material.

11. The liquid fuel cartridge of claim 1, wherein the flow space is a serpentine shape including a plurality of bent portions.

* * * * *